(12) United States Patent
Fukai et al.

(10) Patent No.: US 7,975,128 B2
(45) Date of Patent: Jul. 5, 2011

(54) APPARATUSES AND PROGRAMS FOR IMPLEMENTING A FORWARDING FUNCTION

(75) Inventors: Shin-ichiro Fukai, Osaka (JP); Makoto Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/161,124

(22) PCT Filed: Oct. 16, 2006

(86) PCT No.: PCT/JP2006/320576
§ 371 (c)(1),
(2), (4) Date: Jul. 16, 2008

(87) PCT Pub. No.: WO2007/083421
PCT Pub. Date: Jul. 26, 2007

(65) Prior Publication Data
US 2010/0169610 A1   Jul. 1, 2010

(30) Foreign Application Priority Data

Jan. 20, 2006  (JP) ................................. 2006-013029

(51) Int. Cl.
*G06F 9/40* (2006.01)
(52) U.S. Cl. ........................................ 712/218; 712/200
(58) Field of Classification Search ........................ None
See application file for complete search history.

(56) References Cited

U.S. PATENT DOCUMENTS

| | | | | |
|---|---|---|---|---|
| 5,642,512 A * | 6/1997 | Tanaka et al. | ................. | 717/153 |
| 5,706,407 A * | 1/1998 | Nakamura et al. | ............ | 700/251 |
| 5,781,753 A * | 7/1998 | McFarland et al. | ........... | 712/218 |
| 6,145,074 A | 11/2000 | Asato et al. | | |
| 6,330,684 B1 | 12/2001 | Yamanaka et al. | | |
| 6,477,661 B2 | 11/2002 | Yamanaka et al. | | |
| 6,735,714 B2 | 5/2004 | Yamanaka et al. | | |
| 6,862,677 B1 * | 3/2005 | Stravers | ........................ | 712/218 |
| 6,889,317 B2 * | 5/2005 | Sami et al. | .................... | 712/218 |
| 7,096,345 B1 * | 8/2006 | Chen et al. | .................... | 712/218 |
| 7,293,177 B2 * | 11/2007 | Lahti et al. | ..................... | 713/188 |
| 7,730,284 B2 * | 6/2010 | Srinivasan et al. | ............ | 712/218 |
| 2004/0193929 A1 | 9/2004 | Kuranuki | | |
| 2005/0080951 A1 * | 4/2005 | Teng | ............................... | 710/52 |

(Continued)

FOREIGN PATENT DOCUMENTS

JP             11-65844           3/1999

(Continued)

OTHER PUBLICATIONS

English language Abstract of JP 11-65844, Mar. 9, 1999.
English language Abstract and partial translation of JP 2000-305777, Feb. 11, 2000.

(Continued)

*Primary Examiner* — Idriss N Alrobaye
(74) *Attorney, Agent, or Firm* — Greenblum & Bernstein, P.L.C.

(57) ABSTRACT

The processor according to the present invention is a processor having a forwarding function and includes an attribute information holding unit (141) that holds attribute information regarding inhibition of writing to a register and a register write inhibition circuit (126) that holds, when forwarding is performed, the writing of the data forwarded according to attribute information. The attribute information holding unit (141) holds the attribute information by relating the attribute information to at least one register. Alternatively, the attribute information holding unit is a part of plural pipeline buffers and passes the attribute information along with the data to be forwarded, to a pipeline buffer in a subsequent stage.

4 Claims, 14 Drawing Sheets

U.S. PATENT DOCUMENTS

| | | |
|---|---|---|
| 2006/0064679 A1 | 3/2006 | Ozaki |
| 2007/0255928 A1 | 11/2007 | Fukai |
| 2008/0065833 A1 | 3/2008 | Hosoki et al. |

FOREIGN PATENT DOCUMENTS

| | | |
|---|---|---|
| JP | 2000-305777 | 2/2000 |
| JP | 2003-122561 | 4/2003 |
| WO | 2004/084065 | 3/2004 |

OTHER PUBLICATIONS

English language Abstract and partial translation of JP 2003-122561, Apr. 25, 2003.

David A. Patterson, John L. Hennessy, "Computer Organization and Design: The Hardware/Software Interface $2^{nd}$ edition (2)." Issued by Nikkei Business Publications, Inc. pp. 440-452 (Jun. 2, 2005) and an English language translation.

\* cited by examiner

FIG. 2A
PRIOR ART

```
ld Reg#0,(Reg#31)           ; Reg#0←(Reg#31)
add Reg#2, Reg#0,Reg#1      ; Reg#2←Reg#0+Reg#1
......
```

FIG. 2B
PRIOR ART

| FWD | ID  | EX  | MEM | WB  |
|-----|-----|-----|-----|-----|
| t1  | ld  | —   | —   | —   |
| t2  | add | ld  | —   | —   |
| t3  | add | ×   | ld  | —   |
| t4  | —   | add | ×   | ld  |
| t5  | —   | —   | add | ×   |
| t6  | —   | —   | —   | add |

FIG. 2C
PRIOR ART

| FWD | ID    | EX    | MEM   | WB    |
|-----|-------|-------|-------|-------|
| t1  | ld    | —     | —     | —     |
| t2  | inst1 | ld    | —     | —     |
| t3  | inst2 | inst1 | ld    | —     |
| t4  | add   | inst2 | inst1 | ld    |
| t5  | —     | add   | inst2 | inst1 |
| t6  | —     | —     | add   | inst2 |
| t7  | —     | —     | —     | add   |

FIG. 2D
PRIOR ART

| NO FWD | ID  | EX  | MEM | WB  |
|--------|-----|-----|-----|-----|
| t1     | ld  | —   | —   | —   |
| t2     | add | ld  | —   | —   |
| t3     | add | ×   | ld  | —   |
| t4     | add | ×   | ×   | ld  |
| t5     | add | ×   | ×   | ×   |
| t6     | —   | add | ×   | ×   |
| t7     | —   | —   | add | ×   |
| t8     | —   | —   | —   | add |

US 7,975,128 B2

APPARATUSES AND PROGRAMS FOR IMPLEMENTING A FORWARDING FUNCTION

TECHNICAL FIELD

The present invention relates to a processor having forwarding controls, and particularly to reduction of power consumption.

BACKGROUND ART

Conventionally, in a pipelined processor, forwarding (FWD) control is used for improving processing performance. Forwarding control refers to the forwarding of data, from a stage (for example, a memory access (MEM) stage, or a write back (WB) stage) in which an execution result of a preceding instruction is outputted, to a stage in which succeeding instruction data is fetched (EX stage). Since this bypasses the data resulting from an execution of the preceding instruction, it becomes possible to solve or reduce data hazards.

FIG. 1 is a diagram showing a configuration of a conventional pipelined processor having a forwarding control mechanism. In the figure, bold lines mainly represent data, and thin lines mainly represent a control signal.

As shown in the figure, the conventional pipelined processor having a forwarding control mechanism includes: an instruction decoding unit 910, an instruction control unit 920, an instruction execution unit 930, and a register file 940. The instruction control unit 920 includes: a FWD control circuit 921, a register file write circuit 922, a pipeline buffer control circuit 923, an operation processing control circuit 924, and a memory access control circuit 925. The instruction execution unit 930 includes: an operation processing execution circuit 931, a memory access execution circuit 932, a FWD selector 933, a MEM selector 934, a pipeline buffer (EX) 935, a pipeline buffer (MEM) 936, and a pipeline buffer (WB) 937. The register file 940 includes a data holding unit 942 including plural registers (Reg#0 to Reg#N) managed by register number (#0 to #N). In addition, the pipeline includes: a decode (DEC) stage, an instruction dispatch and register fetch (ID) stage, an execute (EX) stage, a memory access (MEM) stage, and a write back (WB) stage.

First, the operation of the conventional pipelined processor at the time of execution of an instruction shall be described according to each stage of the pipeline.

In the DEC stage, an instruction decoding unit 910 generates instruction decoding information to be used after the ID stage, and outputs the instruction decoding information to the instruction control unit 920.

In the ID stage, input data for executing the instruction is generated by reading, in accordance with the instruction decoding information, register data from the register file 940, and the data is outputted to the pipeline buffer (EX) 935.

In the EX stage, in accordance with the instruction decoding information, either the operation processing control circuit 924 or the memory access control circuit 925 generates a control signal for instruction execution input data stored in the pipeline buffer (EX) 935, and causes the operation processing execution circuit 931 or the memory access execution circuit 932 to operate.

In addition, the pipeline buffer control circuit 923 opens the pipeline buffer (MEM) 936, and stores, in the pipeline buffer (MEM) 936, the execution result of the instruction outputted from the operational processing execution circuit 931, to perform operational processing.

In the MEM stage, in accordance with the instruction decoding information, the pipeline buffer control circuit 923 generates a selection control signal so that either the value of the pipeline buffer (MEM) 936 or the output of the memory access execution circuit 932 that is the execution result of an instruction to execute memory access is selected, and outputs the selection control signal to the MEM selector 934.

In addition, the pipeline buffer control circuit 923 opens the pipeline buffer (WB) 937, and stores the instruction execution result outputted from the MEM selector 934.

In the WB stage, in accordance with the instruction decoding information, the register file write control circuit 922 generates a write control signal for the register file 940, and writes the instruction execution result outputted from the pipeline buffer (WB) 937 into the register file 940; thereby data in the data holding unit 942 is updated.

Next, the forwarding control mechanism shall be described.

The FWD control circuit 921 judges whether or not each of the registers that are written in accordance with instructions executed as preceding instructions in the EX stage, MEM stage, and WB stage matches the register that is read according to the ID-stage instruction executed as a succeeding instruction. The operations are divided into the following (1) to (4) according to the result of the judgment.

(1) In the case where, as a result of the judgment, the register that is read according to the ID-stage instruction does not match the register that is written according to each of the EX-stage, MEM-stage, and WB-stage instructions, the FWD control circuit 921 generates a selection control signal so that register data having been read from the register file 940 is selected, and outputs the selection control signal to the FWD selector 933.

(2) In the case where the register that is read according to the ID-stage instruction matches the register that is written according to the EX-stage instruction, the instruction execution result for the register to be read out is not yet properly written; therefore, the FWD control circuit 921 suspends the pipeline.

(3) In the case where the register that is read according to the ID-stage instruction matches the register that is written according to the MEM-stage instruction, there is a path for forwarding the instruction execution result from the MEM stage to the ID stage; therefore, the FWD control circuit 921 generates, as input data for executing the instruction, a selection control signal so that the path for forwarding the instruction execution result from the MEM stage to the ID stage is selected, and outputs the selection control signal to the FWD selector 933.

(4) In the case where the register that is read by the ID-stage instruction matches the register that is written according to the WB-stage instruction, there is a path for forwarding the instruction execution result from the WB stage to the ID stage; therefore, the FWD control circuit 921 generates a selection control signal so that the path for forwarding the instruction execution result from the WB stage to the ID stage is selected, and outputs the selection control signal to the FWD selector 933. With this, forwarding is performed from the WB stage to the ID stage.

The pipeline buffer control circuit 923 opens the pipeline buffer (EX) 935 and stores the instruction execution input data outputted by the FWD selector 933.

Furthermore, an exemplary instruction sequence in which data is forwarded shall be described with reference to FIGS. 2A to 2D.

FIG. 2A shows an example of an instruction sequence having data dependency. In the figure, a preceding load (ld)

instruction instructs to read data from memory, using the value of Reg#31 as an address, and to load the read-out data onto the Reg#0. A succeeding add instruction instructs to add the values of Reg#0 and Reg #1 and store the add result to Reg#2.

FIG. 2B is an example showing the timing of forwarding, particularly the forwarding from the MEM stage to the ID stage. The diagram shows the pipeline stages and execution cycles when the instruction sequence in FIG. 2A is executed. However, the stages prior to the DEC stage is omitted. The above-described load instruction is pipeline-processed sequentially in the ID stage, the EX stage, the MEM stage, and the WB stage in 4 cycles from t1 to t4, without generating a hazard. The above-described add instruction is processed through the four stages in 5 cycles from t2 to t5, generating a hazard in cycle t3. This is because in cycle t3 the execution of the preceding load instruction (to read the data to be stored in Reg#0 from memory) is not yet completed, and therefore the input data required for the execution of the succeeding add instruction (data to be stored in Reg#0) is not read. However, in cycle t3 (specifically in the latter half thereof), the input data from the MEM stage of the preceding load instruction to the ID stage of the succeeding add instruction (data to be stored in Reg#0) is forwarded from the MEM selector 934, through the FWD selector 933, to the pipeline buffer (EX) 935. With this, when the cycle proceeds from t3 to t4, the writing to the Reg#0 is not yet completed, but the succeeding add instruction can be transferred from the ID stage to the EX stage.

Note that the timing described in FIG. 2B is the same in the case where a simple instruction that does not include memory access (such as a NOP instruction, which instructs the register and the memory to perform no processing) is inserted between the load instruction and the add instruction in FIG. 2A. In this manner, the forwarding operation from the MEM stage to the ID stage is executed in the case of the instruction sequence shown in FIG. 2A and the case where a simple instruction is inserted, for the instruction sequence in FIG. 2A, between the load instruction and the add instruction. In addition, in the case where an instruction is inserted, no hazard is generated.

FIG. 2C is an example showing the timing of forwarding, particularly the forwarding from the WB stage to the ID stage. The diagram shows pipeline stages and execution cycles when, in FIG. 2A, two simple instructions that do not include memory access are inserted between the load instruction and the add instruction. In this example, the two instructions inserted between the load instruction and the add instruction are referred to as inst1 and inst2. The above add instruction is processed through the four stages in 4 cycles from t4 to t7. However, in cycle t4 (specifically in the latter half thereof), the input data (data to be stored in Reg#0) from the WB stage of the preceding load instruction to the ID stage of the succeeding add instruction is forwarded from the MEM selector 934, through the FWD selector 933, to the pipeline buffer (EX) 935. With this, in cycle t4, the succeeding add instruction can be transferred from the ID stage to the EX stage, even when the writing to Reg#0 is not yet completed. With this, when the cycle proceeds to t4 to t5, the succeeding add instruction can be transferred from the ID stage to the EX stage although Reg#0 cannot be read out. Thus, the forwarding operation from the WB stage to the ID stage is executed in the case where two simple instructions are inserted, for the instruction sequence shown in FIG. 2A, between the load instruction and add instruction, and where such an instruction sequence does not generate a hazard.

FIG. 2D is a diagram showing pipeline stages and execution cycles in the case where the instruction sequence in FIG. 2A is executed by a processor which does not have a forwarding mechanism. In this case, a hazard is generated for three cycles. This is because the succeeding add instruction reads Reg#0 in the ID stage after completion of the writing to Reg#0 in the WB stage of the preceding load instruction.

Non-Patent Reference 1: John L. Hennessy, David A. Patterson, "Computer Organization and Design: The Hardware/Software Interface $2^{nd}$ edition (2)," issued by Nikkei Business Publications, Inc. Jun. 2, 2005 pp. 440-452

DISCLOSURE OF INVENTION

Problems that Invention is to Solve

However, according to the prior art, there is a problem of power consumption resulting from unnecessary writing to a register file. Specifically, in the prior art, in the case where the register data that is an execution result of a preceding instruction is referred to only by a succeeding instruction, and where data is forwarded, even the instruction execution result of the preceding instruction is written into the register file 940, the value is not read according to the succeeding instruction.

In view of the above problem, the present invention has an object to provide a low-power consumption processor that reduces power consumption resulting from unnecessary writing to the register file.

Means to Solve the Problems

In order to achieve the object, the processor according to the present invention is a processor having a forwarding function, and includes a holding unit that holds attribute information regarding inhibition of writing to a register and a control unit that inhibits, when data is forwarded, writing of the forwarded data to the register, according to the attribute information.

According to the configuration, it is possible to reduce power consumption resulting from unnecessary writing and achieve lower power consumption.

Here, the holding unit may hold the attribute information in association with at least one register.

According to the configuration, it is possible to set, as an attribute for the register, whether or not to inhibit unnecessary writing to the register.

Here, the processor may include pipeline buffers structured in stages and sequentially passing data between pipeline stages, and the holding unit may be a part of the pipeline buffers and pass the attribute information, along with data to be forwarded, to one of the pipeline buffers in a subsequent stage.

According to the configuration, it is possible to set, as an attribute for operand data specified by the instruction, whether or not to inhibit unnecessary writing to the register.

Here, the processor may further include an instruction decoding unit that outputs the attribute information to one of the pipeline buffers, when an instruction including a register write inhibition indication is decoded.

According to the configuration, it is possible to set a register write inhibition indication (attribute) with respect to each instruction.

Here, the processor includes pipeline buffers structured in stages and sequentially passing data between pipeline stages, and the inhibition unit may further inhibit, when the data is forwarded, the writing of the data to a subsequent one of the pipeline buffers.

According to the configuration, it is possible to further reduce power consumption, since this inhibits the writing of the data to the subsequent pipeline buffers, in addition to inhibiting unnecessary writing to the register.

Here, the processor may include a control register that directs whether or not to inhibit the writing to the register, and the holding unit may hold attribute information corresponding to data held in the control register.

According to the configuration, the attribute information in the holding unit can be changed by the setting of the control register. For example, by setting the control register so as not to inhibit the writing to the register, it becomes possible to maintain compatibility with an existent program; by setting the control register so as to inhibit the writing to a particular register, it is possible to execute a new program.

Here, the processor may further update the attribute information in the holding unit by executing an attribute change instruction to change attribute information.

According to the configuration, it is possible to arbitrarily change, according to an attribute change instruction, the attribute for the register for setting whether or not to inhibit unnecessary writing to the register.

In addition, the program conversion apparatus according to the present invention is a program conversion apparatus that converts an original program into a program for use in the processor in a first aspect of the present invention, and the program conversion apparatus includes: an extraction unit that extracts, from the original program, a variable to be stored in a register; a detection unit that detects a live range for the extracted variable; a first judgment unit that judges whether or not only one reference instruction is present in the live range, the reference instruction being an instruction to refer to the variable; a second judgment unit that judges whether or not a definition instruction and the reference instruction are intended for forwarding, the definition instruction being an instruction to define the variable; and a generation unit that generates a program including an inhibition instruction to inhibit writing to the register according to the definition instruction, in the case where it is judged that only one reference instruction is present in the live range and that the reference instruction is intended for forwarding.

According to this configuration, it becomes possible to realize a program that reduces power consumption resulting from unnecessary writing to the register file and achieves lower power consumption.

In addition, the program conversion method according to the present invention has the same units as the above.

In addition, attribute information indicates whether or not to write the execution result of an instruction to the register file, when a forwarding operation is performed.

According to this, when the forwarding operation is performed, it is judged, according to the attribute information, whether or not to perform writing to the register file, and when judged that writing is not necessary, the writing to the register file is inhibited, thereby reducing power consumption.

Effects of the Invention

As described above, with the processor according to the present invention, it is possible to provide a processor which reduces power consumption resulting from unnecessary writing to the register file and thereby achieves lower power consumption.

BRIEF DESCRIPTION OF DRAWINGS

FIG. 2A shows an example of an instruction sequence having data dependency.

FIG. 2B is a diagram showing the timing of exemplary forwarding from the MEM stage to the ID stage.

FIG. 2C is a diagram showing the timing of exemplary forwarding from the WB stage to the ID stage.

FIG. 2D is a diagram showing pipeline stages and execution cycles executed by a processor which does not have a forwarding mechanism.

Figure 1:
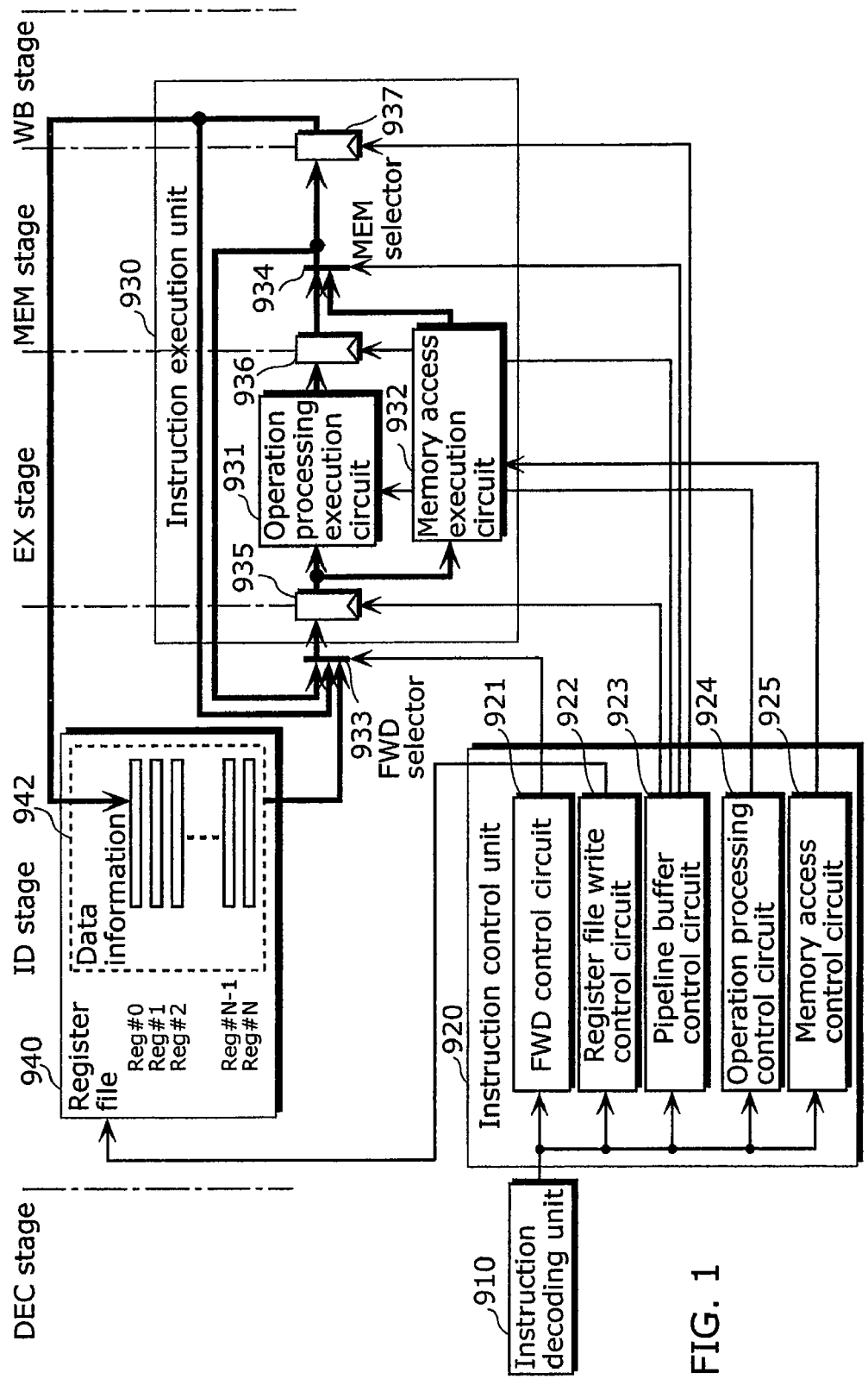
FIG. 1 is a diagram showing a configuration of a pipeline processor in the prior art, which has a forwarding control mechanism.

NUMERICAL REFERENCES 110, 510, 610 Instruction decoding unit
120, 620 Instruction control unit
121 FWD control circuit
122 Register file write control circuit
123 Pipeline buffer control circuit
124 Operation processing control circuit
125 Memory access control circuit
126, 626 Register write inhibition circuit
126a Attribute selector
126b AND gate
126c Attribute selector
126d AND gate
130 Instruction execution unit
131 Operation processing execution circuit
132 Memory access execution circuit
133 FWD selector
134 MEM selector
135, 635 Pipeline buffer (EX)
136, 636 Pipeline buffer (MEM)
137, 637 Pipeline buffer (WB)
138, 139, 201, 638, 639 Inhibition gate
139 Inhibition gate
140 Register file
141, 641 Attribute holding unit
142 Data holding unit
341 Attribute information
602 Compiler
604, 804 Extended assembler

BEST MODE FOR CARRYING OUT THE INVENTION

First Embodiment

A processor in a first embodiment includes a register file made up of registers each having separate attribute information, and controls, according to the attribute information, whether or not to write to the register file.

Hereinafter, a first embodiment of the present invention shall be described with reference to the drawings.

Figure 3:
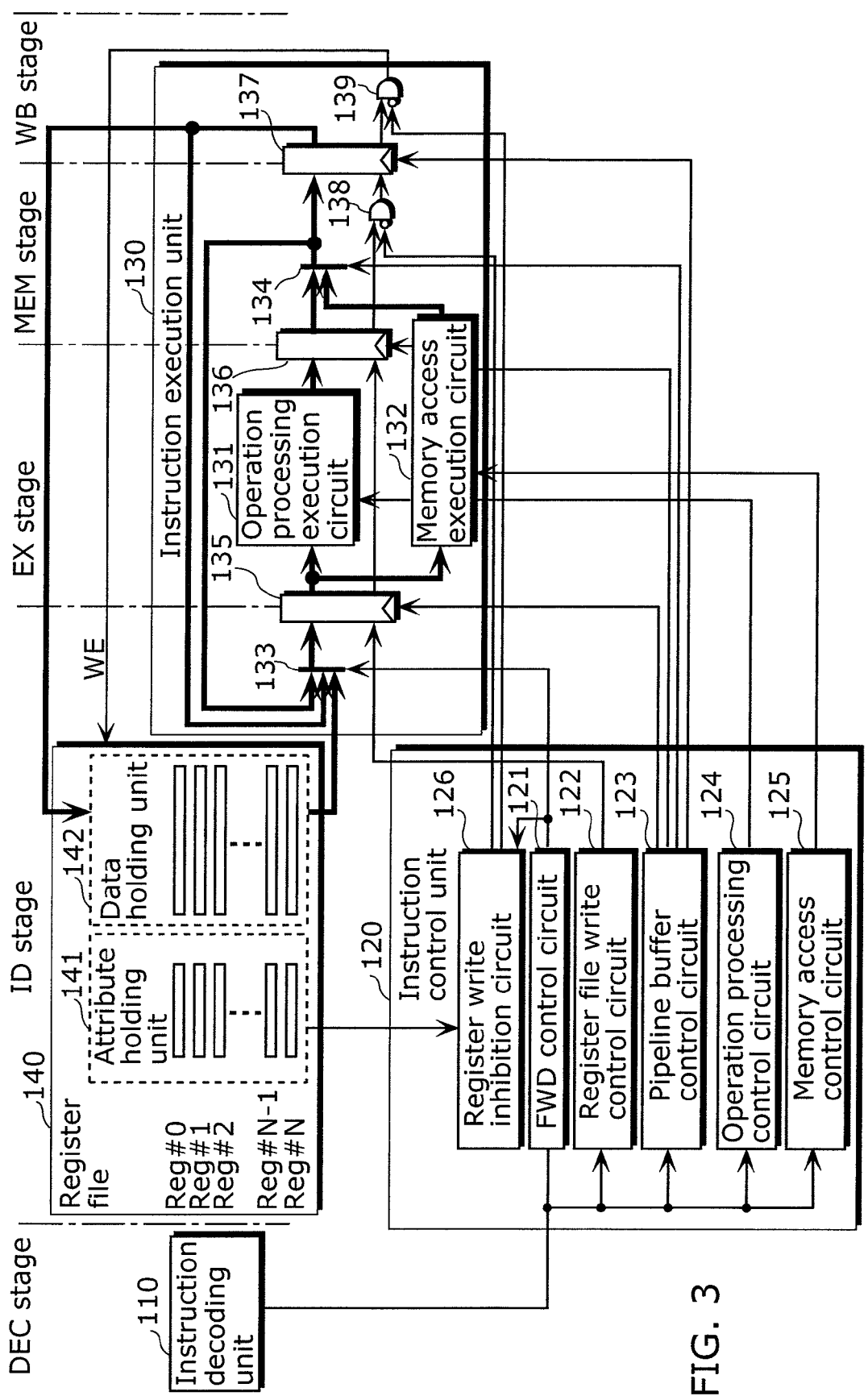
FIG. 3 is a diagram showing a configuration of a processor in a first embodiment.

FIG. 3 is a diagram showing the configuration of the processor in the first embodiment. In the figure, bold lines mainly represent data, and thin lines mainly represent a control signal. The processor is pipelined and has a forwarding mechanism. As the figure shows, the processor includes: an instruction decoding unit 110, an instruction control unit 120, an instruction execution unit 130, and a register file 140.

The instruction control unit 120 includes: a FWD control circuit 121, a register file write control circuit 122, a pipeline buffer control circuit 123, an operation processing control circuit 124, a memory access control circuit 125, and a register write inhibition unit 126. In addition, an instruction execution unit 130 has: an operation processing execution circuit 131, a memory access execution circuit 132, a FWD selector 133, a MEM selector 134, a pipeline buffer (EX) 135, a pipeline buffer (MEM) 136, a pipeline buffer (WB) 137, an inhibition gate 138, and an inhibition gate 139. Of these, the register write inhibition unit 126, the inhibition gate 138, and the inhibition gate 139 function, when data is forwarded, as control units that inhibit the writing of the forwarded data into the register according to attribute information.

The register file 140 is managed by register number (#0 to #N), and includes an attribute information holding unit 141 and a data holding unit 142. The attribute information holding unit 141 has plural pieces of attribute information (Atr#0 to Atr#N) corresponding to the respective register numbers. The data holding unit 142 is made up of plural registers (Reg#0 to Reg#N) holding data according to the respective register numbers. The attribute information holding unit 141 holds attribute information regarding the inhibition of writing to the register. Each piece of attribute information indicates "whether or not to write the execution result of the instruction into the corresponding register when a forwarding operation is performed", and is set to 0 in the case where "the execution result of the instruction is written into the register file when the forwarding operation is performed", and is set to 1 in the case where "the execution result of the instruction is not written into the register file when the forwarding operation is performed".

In addition, the above processor includes, as pipeline stages, the five following stages: a DEC stage, an ID stage, an EX stage, a MEM stage, and a WB stage.

The operation of the processor in the present embodiment configured as above shall be described according to each stage of the pipelines.

(DEC stage)

In the DEC Stage, an Instruction Decoding Unit 110 Generates instruction decoding information to be used after the ID stage, and outputs the instruction decoding information to the instruction control unit 120.

(ID stage)

In the ID stage, the value of the register to be read when an instruction is executed is generated as instruction execution input data, and the instruction execution input data is outputted to the instruction execution unit 130.

First, the FWD control circuit 121 judges whether the register that is read according to an ID-stage instruction executed as a succeeding instruction matches the registers to be written according to the instructions of the EX stage, MEM stage, and WB stage that are executed as preceding instructions. The operations are divided into the following (1) to (4) according to the result of the judgment.

(1) In the case where the register that is read according to the ID-stage instruction does not match any one of the registers that are written according to the instructions of the EX stage, the MEM stage, and the WB stage, the FWD control circuit 121 generates, as instruction execution input data, a selection control signal so that a value is directly selected from the register file 140, and outputs the selection control signal to the FWD selector 133.

(2) In the case where the register that is read according to the ID-stage instruction matches the register that is written according to the EX-stage instruction, it is not possible to read the instruction execution result for the register to be read; therefore, the FWD control circuit 921 suspends the pipeline.

(3) In the case where the register that is read by the ID-stage instruction matches the register that is written according to the MEM-stage instruction, there is a path for forwarding the instruction execution result from the MEM stage to the ID stage; therefore, the FWD control circuit 121 generates a selection control signal so that the path for forwarding the instruction execution result from the MEM stage to the ID stage is selected, and outputs the selection control signal to the FWD selector 133. Thus, the forwarding operation from the MEM stage to the ID stage is performed.

When the attribute information corresponding to the write destination register for the forwarded data indicates 1, the register write inhibition circuit 126 asserts a mask signal MASK-MEM to an inhibition gate 138. When the mask signal MASK-MEM is asserted, the inhibition gate 138 inhibits the writing of the forwarded data to the register by masking a Write Enable (WE) signal that is outputted from the pipeline buffer (MEM) 136 to the pipeline buffer (WB) 137.

(4) In the case where the register that is read according to the ID-stage instruction matches the register that is written according to the WB-stage instruction, there is a path for forwarding the instruction execution result from the WB stage to the ID stage; therefore, the FWD control circuit 121 generates a selection control signal so that the path for forwarding the instruction execution result from the WB stage to the ID stage is selected, and outputs the selection control signal to the FWD selector 133. The pipeline buffer control circuit 123 opens the pipeline buffer (EX) 135 and stores the instruction execution input data outputted by the FWD selector 133. Thus, the forwarding operation from the WB stage to the ID stage is performed.

When the attribute information corresponding to the write destination register for the forwarded data indicates 1, the register write inhibition circuit 126 asserts a mask signal MASK-WB to an inhibition gate 139. When the mask signal MASK-WB is asserted, the inhibition gate 139 inhibits the writing of the forwarded data to the register by masking a Write Enable (WE) signal that is outputted from the pipeline buffer (WB) 137 to the register file 140.

(EX Stage)

In the EX stage, in accordance with the instruction decoding information, either the operation processing control circuit 124 or the memory access control circuit 125 generates a control signal for instruction execution input data stored in the pipeline buffer (EX) 135 and causes the operation processing execution circuit 131 or the memory access execution circuit 132 to operate.

In addition, the pipeline buffer control circuit 123 opens the pipeline buffer (MEM) 136, and stores the execution result of the instruction to perform operational processing, which is outputted from the operational processing execution circuit 131.

(MEM Stage)

In the MEM stage, in accordance with the instruction decoding information, the pipeline buffer control circuit 123 generates a selection control signal so that either the value of the pipeline buffer (MEM) 136 or the output of the memory access execution circuit 132 that is the execution result of an instruction to perform memory access is selected, and outputs the selection control signal to the MEM selector 134.

In addition, the pipeline buffer control circuit 123 opens the pipeline buffer (WB) 137, and stores the instruction execution result outputted by the EM selector 134.

(WB stage)

In the WB stage, in accordance with the instruction decoding information, the register file write control circuit 122 generates a write control signal for the register file 140, and writes the instruction execution result outputted from the pipeline buffer (WB) 137 into the register file 940; thereby data in the data holding unit 142 is updated.

However, in the case where the attribute information holding unit 141 indicates 1 and where it is detected that the instruction execution result has been read by the forwarding operation, according to the succeeding instruction, in a stage from the FWD control circuit 121 to the MEM stage or the WB stage, the register file write control circuit 122 does not generate a write control signal for the register file 140, so that the instruction execution result, which is outputted from the pipeline buffer (WB) 137, is not written into the register file 140, and data in the data holding unit 142 is not updated.

Figure 4:
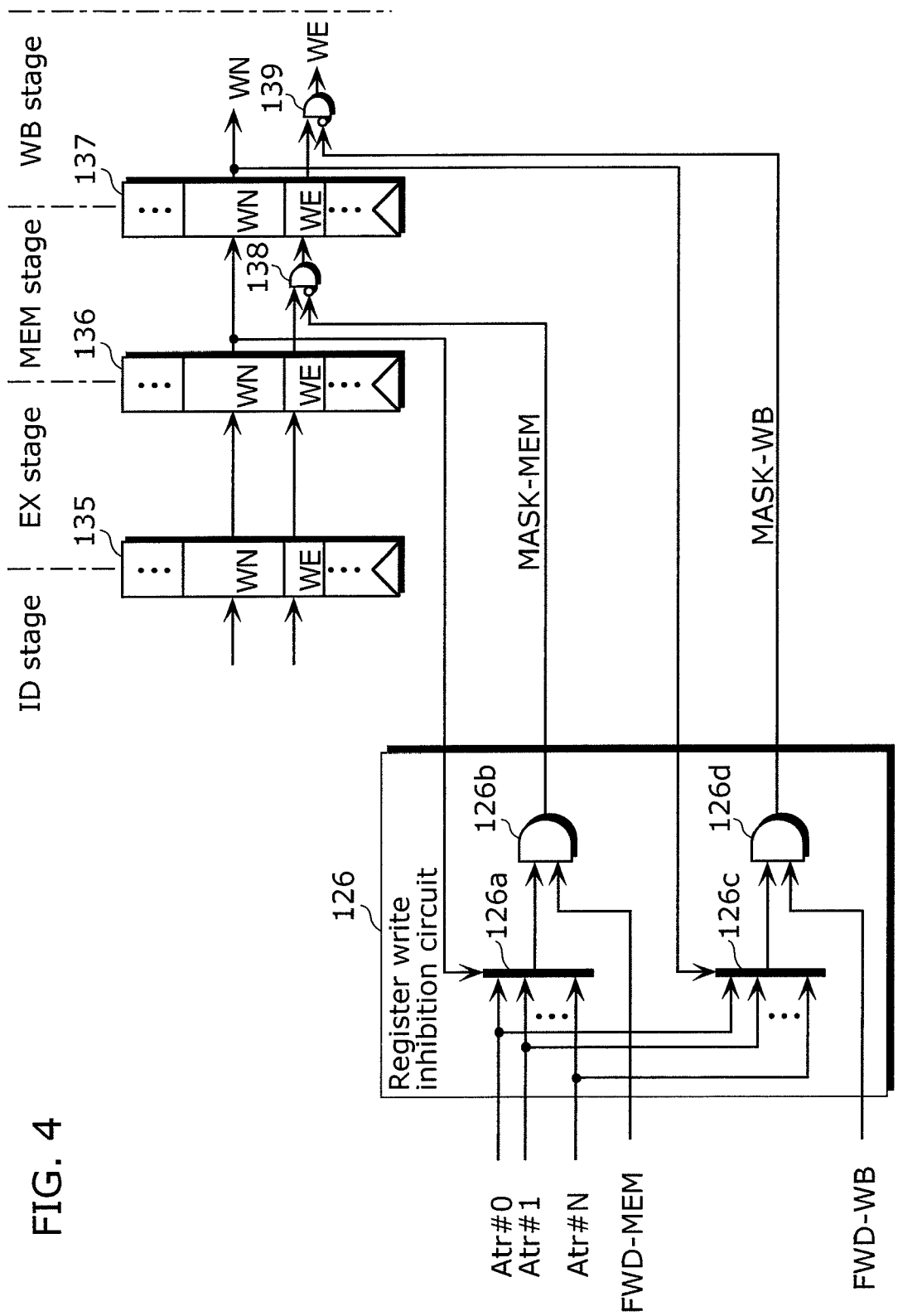
FIG. 4 is a diagram showing a configuration of a register write inhibition circuit.

FIG. 4 is a diagram showing an exemplary configuration of the register write inhibition circuit 126 and the periphery thereof. In the figure, the register write inhibition circuit 126 includes: an attribute selector 126a, an AND gate 126b, an attribute selector 126c, and an AND gate 126d. In addition, the figure illustrates: of the plural stages of the pipeline buffers receiving and passing the data between each pipeline stage, a part of the pipeline buffer (EX) 135, the pipeline buffer (MEM) 136, and the pipeline buffer (WB) 137, respectively. Write Number (WN) in the figure represents the register number of the write destination register. WE represents a write control signal to the register. A FWD-MEM signal is a signal indicating forwarding from the MEM stage to the ID stage, and is outputted from the FWD control circuit 121. A FWD-WB signal is a signal indicating forwarding from the WB stage to the ID stage, and is outputted from the FWD control circuit 121.

The attribute selector 126a selects attribute information corresponding to the register number indicated by the WN held in the pipeline buffer (MEM) 136, from among attribute information (Atr#0 to ATR#N) held by the attribute information holding unit 141. In other words, the attribute information to be selected is a register number indicating the write destination for the MEM-stage data.

The AND gate 126b ANDs with the attribute information selected by the attribute selector 126a and the FWD-MEM signal, and outputs the AND as a mask signal MASK-MEM. In other words, the AND gate 126b asserts the mask signal MASK-MEM in the case where the data that is the result of the instruction execution is forwarded from the MEM stage to the ID stage and where the attribute information regarding the write destination register for the data indicates that "the instruction execution result is not written in the register file".

The attribute selector 126c selects attribute information corresponding to the register number indicated by the WN held in the pipeline buffer (WB) 137, from attribute information (Atr#0 to ATR#N) held by the attribute information holding unit 141. In other words, the attribute information to be selected is a register number indicating the write destination for the WB-stage data.

The AND gate 126d ANDs with the attribute information selected by the attribute selector 126c and the FWD-WB signal, and outputs the AND as a mask signal MASK-WB. In other words, the AND gate 126d asserts the mask signal MASK-WB in the case where the data that is the result of the instruction execution is forwarded from the WB stage to the ID stage and where the attribute information regarding the write destination register for the data indicates that "the instruction execution result is not written into the register file".

The inhibition gate 138 masks the Write Enable (WE) signal that is outputted from the pipeline buffer (MEM) 136 to the pipeline buffer (WB) 137, according to the mask signal MASK-MEM. With this, the writing of the forwarded data to the register is inhibited.

The inhibition gate 139 masks the Write Enable (WE) signal that is outputted from the pipeline buffer (WB) 137 to the register file 140, according to the mask signal MASK-WB. With this, the writing of the forwarded data to the register is inhibited.

As described above, in the processor according to the first embodiment of the present invention, the register write inhibition circuit 126 inhibits, according to the attribute information held by the attribute information holding unit 141, the writing of the forwarded data into the register when a forwarding operation is performed. With this, it is possible to reduce power consumption by inhibiting unnecessary writing to the register file 140.

Note that all or a part of attribute information Atr#1 to #N may be fixed. In addition, any number of stages of the processor pipelines may be applicable as long as at least one forwarding path is included in the configuration.

Second Embodiment

Hereinafter, a second embodiment of the present invention shall be described with reference to the drawings.

A processor according to the second embodiment is different from the processor in the first embodiment in that the former controls whether or not to update data in the pipeline buffer that is an internal resource of the instruction execution unit.

On the basis of the above points, the processor according to the second embodiment of the present invention shall be described.

Figure 5:
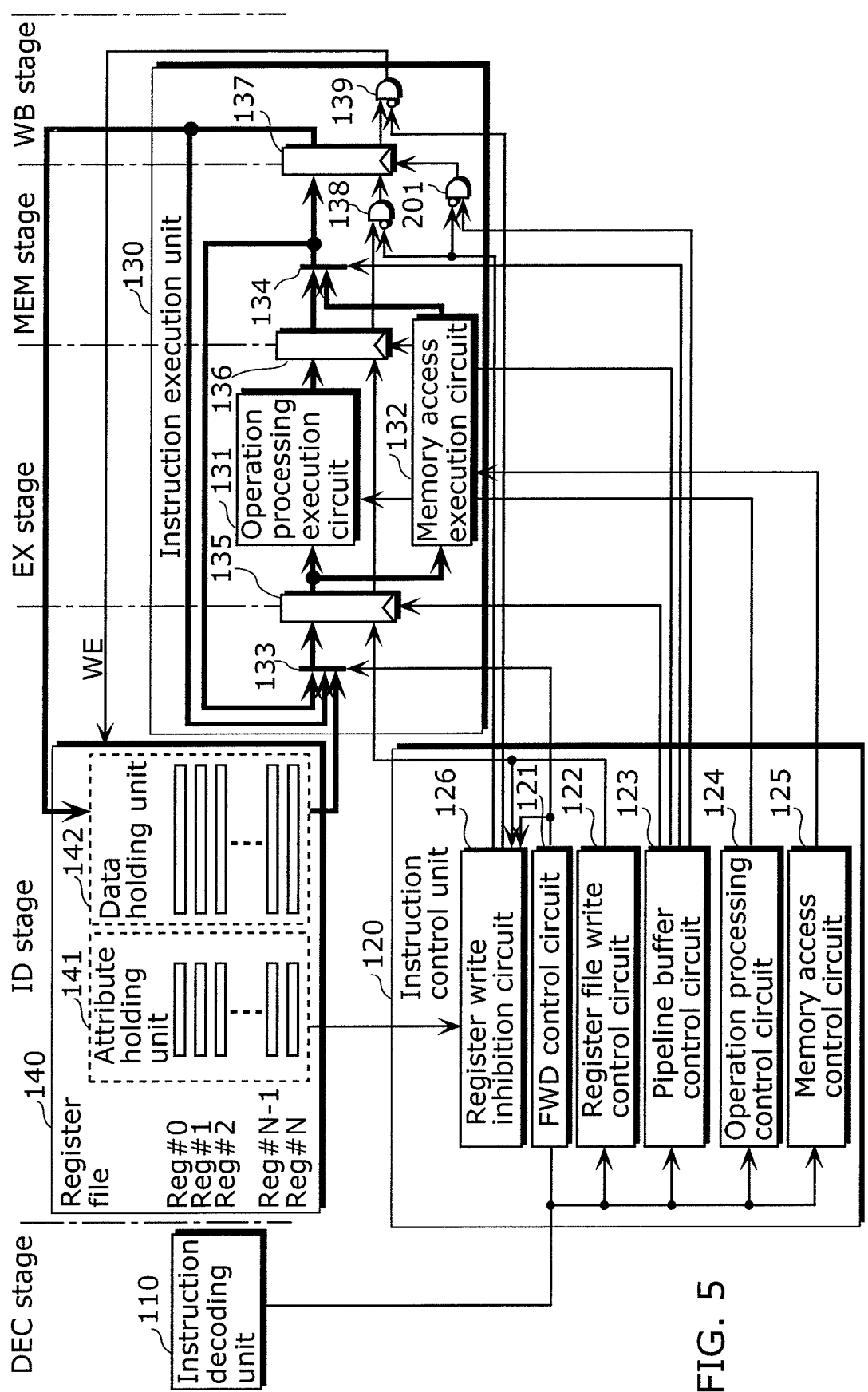
FIG. 5 is a diagram showing a configuration of a processor in a second embodiment.

FIG. 5 is a diagram showing a configuration of the processor in the second embodiment. The difference between the configurations of the processor in FIG. 5 and the processor in the first embodiment is that an inhibition gate 201 is added to the former.

For the operation of the processor in the present embodiment configured as above, the description shall be omitted for the same points as in the processor in the first embodiment, and the point of difference (MEM stage) shall be described.

The inhibition gate 201 masks a write control signal to the pipeline buffer (WB) 137, according to the MASK-WB signal. Since this inhibits the operation of writing to the pipeline buffer (WB) 137, it is possible to reduce the power consumption of the pipeline buffer (WB) 137 in addition to reducing the power consumption of the register file 140.

(MEM Stage)

In the MEM stage, in accordance with the instruction decoding information, the pipeline buffer control circuit 123 generates a selection control signal so that either the value of the pipeline buffer (MEM) 236 or the output of the memory access execution circuit 132 that is the execution result of the instruction to perform memory access is selected, and outputs the selection control signal to the MEM selector 134.

In addition, the pipeline buffer control circuit 123 opens the pipeline buffer (WB) 137 according to a write control signal for the pipeline buffer (WB) 137, and stores the instruction execution result outputted by the MEM selector 134.

However, in the case where the attribute information holding unit 141 indicates 1 and where it is detected that the instruction execution result has been read by the forwarding operation, according to a succeeding instruction, in the step from the FWD control circuit 121 and the MEM stage, the MASK-WB signal is asserted. According to this, the inhibition gate 201 masks the write control signal for the pipeline buffer (WB) 137.

As a result, the pipeline buffer control circuit 123 does not open the pipeline buffer (WB) 137, and does not store, in the pipeline buffer (WB) 137, the instruction execution result outputted by the MEM selector 134.

As described above, in the processor according to the second embodiment of the present invention, it is possible to reduce, when a forwarding operation is performed, power consumption by causing the attribute information holding unit 141 to inhibit unnecessary storage in the pipeline buffer (WB) 137.

Note that the target of write inhibition is not limited to the pipeline buffer in the last stage, and the writing may be inhibited for the pipeline buffer in a stage subsequent to the stage in which the data is forwarded. In addition, the writing to all or a part (the part holding at least WN and WE) of the pipeline buffers may also be inhibited.

Third Embodiment

Hereinafter, a third embodiment of the present invention shall be described with reference to FIG. 6.

The processor according to the third embodiment is different from the processor of the first embodiment in that the former includes some registers having attribute information that does not change and is constantly uniquely-determined.

Figure 6:
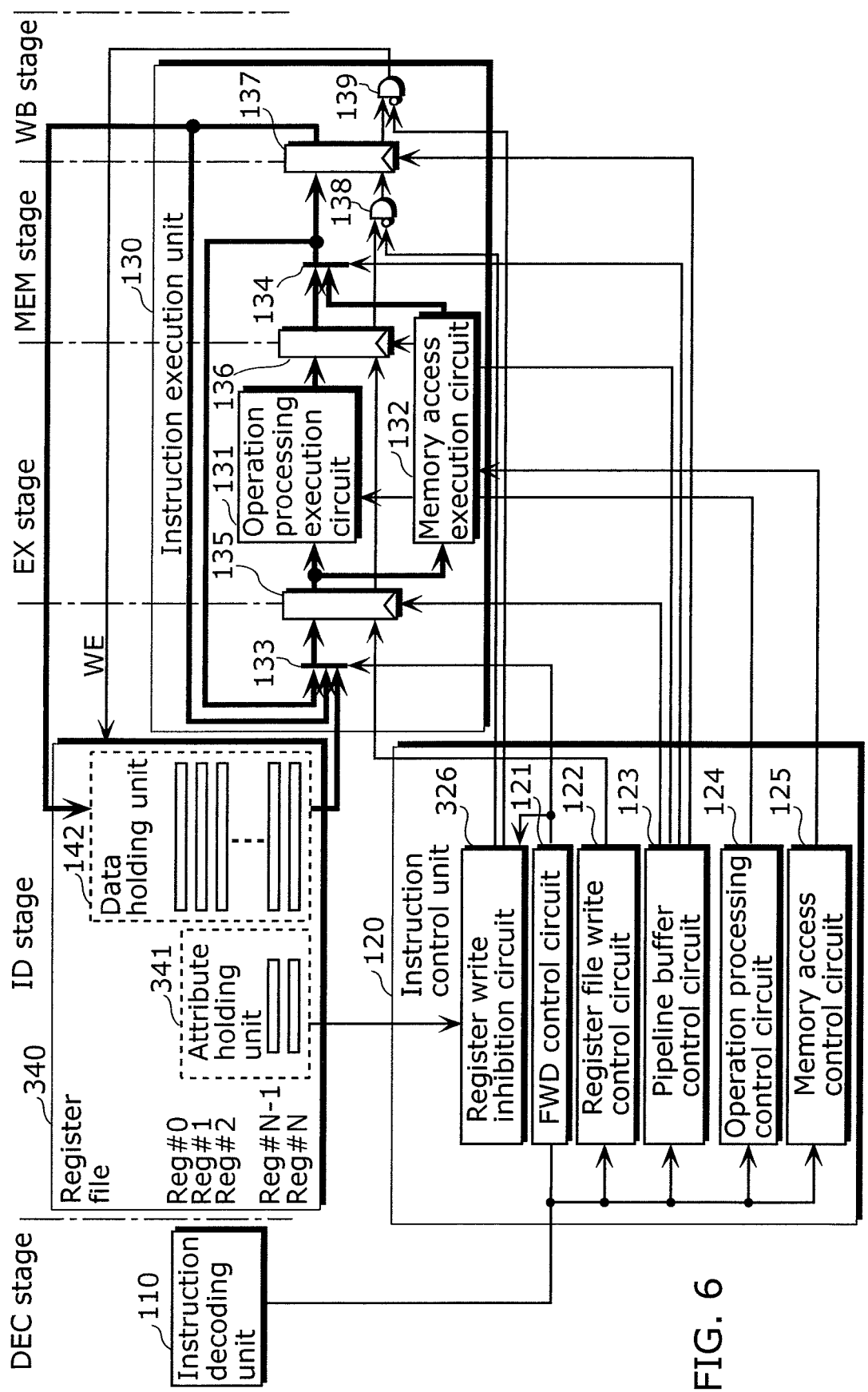
FIG. 6 is a diagram showing a configuration of a processor in a third embodiment.

FIG. 6 is a diagram showing a configuration of the processor in the third embodiment. The difference between the configuration of the processor in FIG. 6 and the processor in the first embodiment is that the former includes: a register file 340 including an attribute information holding unit 141 in place of the register file 140, and a register write inhibition circuit 326 in place of the register write inhibition circuit 126.

For the operation of the processor in the present embodiment configured as above, the description shall be omitted for the same points as in the processor in the first embodiment, and the point of difference shall be described.

The processor in the present embodiment includes an attribute information holding unit 341 that holds an attribute (always 1) corresponding to a specific register (register number Reg#N), instead of including an attribute information holding unit 141 that holds attributes corresponding to the respective registers included in the register file 340.

There is no problem when the register write inhibition circuit 326 has the same configuration as the register write inhibition circuit 126; however, the circuit may be configured such that the attribute selectors 126a and 126c shown in FIG. 4 are removed so as to allow a direct input of Atr#N into AND gates 126b and 126d, respectively.

(WB Stage)

In the WB stage, in accordance with instruction decoding information, the register file write control circuit 122 generates a write control signal for the register file 340, and writes the instruction execution result outputted from the pipeline buffer (WB) 137 into the register file 340; thereby data is updated in the data holding unit 142.

However, in the case where it is detected that the instruction decoding information corresponds to an instruction to write to a specific register (register number Reg#N) and that the instruction execution result has been read by the forwarding operation, according to the succeeding instruction, in the step from a FWD control circuit 121 to the MEM stage or the WB stage, the register file write control circuit 122 does not generate a write control signal to the register file 340, so that the instruction execution result outputted from the pipeline buffer (WB) 137 is not written into the register file 340, and data is not updated in the data holding unit 142.

As described above, in the processor of the third embodiment of the present invention, it is possible to simplify the entire control circuit by relating the attribute information holding unit 341 to a specific register.

Note that the specific register is not limited to one, but plural specific registers may be used.

Fourth Embodiment

Hereinafter, a fourth embodiment of the present invention shall be described with reference to the drawings.

A processor in the fourth embodiment includes a processor status register, in addition to the processor in the second embodiment. On the basis of the point, the processor according to the fourth embodiment of the present invention shall be described.

Figure 7:
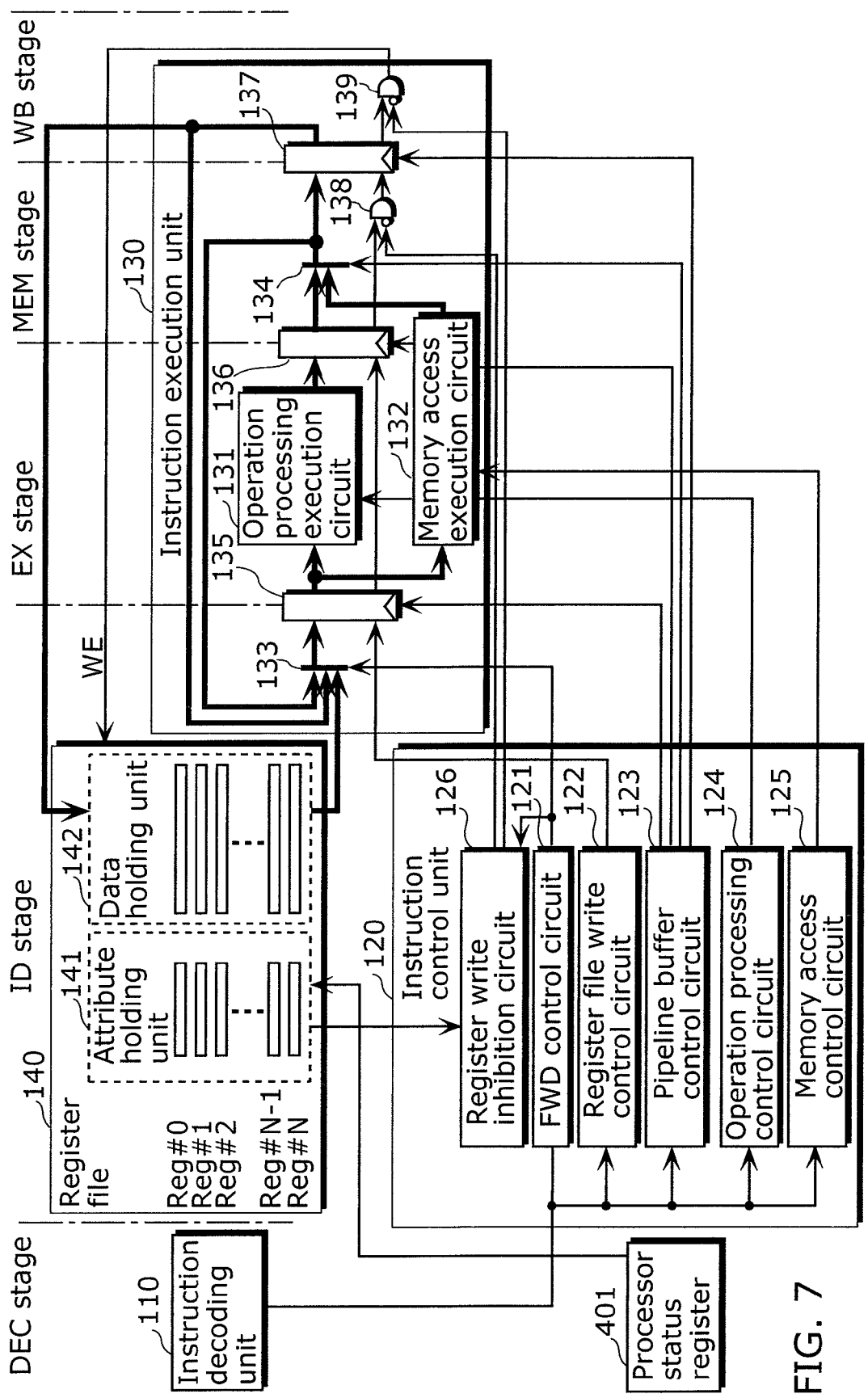
FIG. 7 is a diagram showing a configuration of a processor in a fourth embodiment.

FIG. 7 is a diagram showing a configuration of the processor in the fourth embodiment. The difference between the configuration of the processor in FIG. 7 and the processor in the first embodiment is that the former additionally includes a processor status register 412, the output of which is connected to the attribute information holding unit 141.

For the operation of the processor in the present embodiment configured as above, the description shall be omitted for the same points as in the processor in the first embodiment, and the point of difference shall be described.

The processor status register 412 functions as a control register which indicates whether or not the writing to the register is inhibited. The attribute information holding unit 141 holds attribute information corresponding to the data held in the processor status register 412 (control register).

(WB Stage)

In the WB stage, in accordance with the instruction decoding information, the register file write control circuit 122 generates a write control signal for the register file 140, and writes the instruction execution result outputted from the pipeline buffer (WB) 137 into the register file 140; thereby data is updated in the data holding unit 142.

However, in the case where the attribute information holding unit 141 indicates 1 and where it is detected that the instruction execution result has been read by the forwarding operation, according to the succeeding instruction, in the step from the FWD control circuit 121 to the MEM stage or the WB stage, the register file write control circuit 122 does not generate a write control signal for the register file 140, so that the instruction execution result, which is outputted from the pipeline buffer (WB) 137, is not written into the register file 140, and data in the data holding unit 142 is not updated.

In addition, it is possible to change all values in the attribute information holding unit 141 to 0 by setting the values of the processor status register to a specific value.

As described above, in the processor of the fourth embodiment of the present invention, it is possible to set, using the processor status register 412, the control of the attribute information holding unit 141. For example, it is possible to change the operation of the processor to the operation of a conventional processor by setting the processor status register 412 so that all attribute information from Atr#0 to #N indicates 0, thereby maintaining compatibility between processor operations in the software level.

The processor status register 412 may be set so that only attribute information Atr#N indicates 1, and the data of the processor status register 412 may be fixed or dynamically changed depending on an apparatus in which the processor is included.

Fifth Embodiment

A processor according to the fifth embodiment is different from the processor in the first embodiment in that the former further allows execution of an attribute change instruction as an instruction. On the basis of the point, the processor according to the fifth embodiment of the present invention shall be described.

Figure 8:
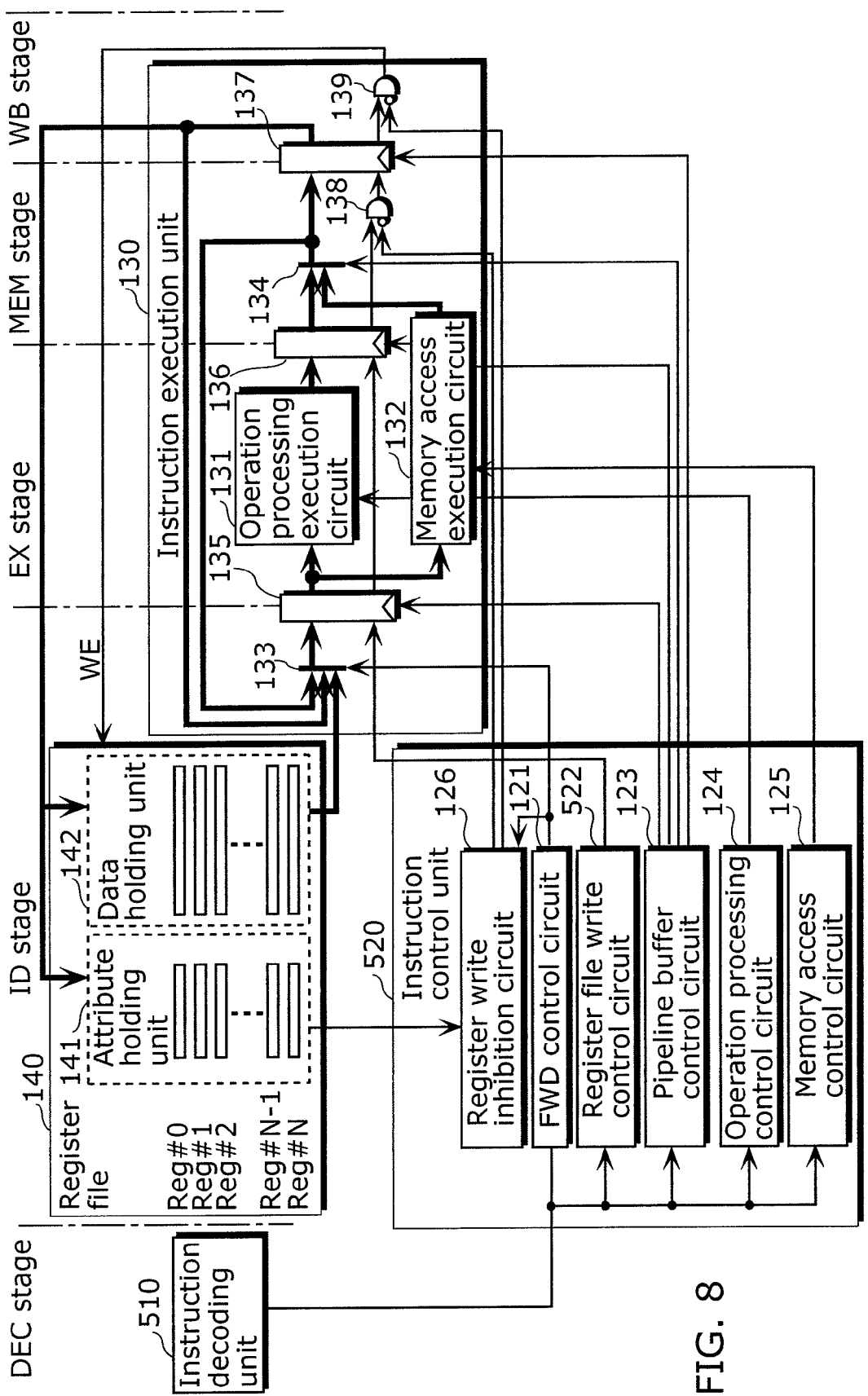
FIG. 8 is a diagram showing a configuration of a processor in a fifth embodiment.

FIG. 8 is a diagram showing a configuration of the processor in the fifth embodiment. The difference between the configurations of the processor in FIG. 8 and the processor in the first embodiment is that in the former, an instruction execution result, which is outputted from the pipeline buffer 137 in the WB stage, is connected to the attribute information 141.

For the operation of the processor in the present embodiment configured as above, the description shall be omitted for the same points as in the processor in the first embodiment, and the point of difference (WB stage) shall be described.

(WB Stage)

In the WB stage, in accordance with the instruction decoding information, the register file write control circuit 122 generates a write control signal for the register file 140, and writes the instruction execution result outputted from the pipeline buffer (WB) 137 into the register file 140; thereby data is updated in the data holding unit 142.

However, in the case where the attribute information holding unit 141 indicates 1 and where it is detected that the instruction execution result has been read by the forwarding operation, according to the succeeding instruction, in the step from the FWD control circuit 121 to the MEM stage or the WB stage, a register file write control circuit 522 does not generate a write control signal for the register file 140, so that the instruction execution result outputted from the pipeline buffer (WB) 137 is not written into the register file 140, and data in the data holding unit 142 is not updated.

When an attribute change instruction "set_attribute Reg#n" is executed, the register file write control circuit 522 generates a write control signal for the register file 140, and the instruction execution result outputted from the pipeline buffer (WB) 137 is written into the register file 140; thereby attribute information in the attribute information holding unit 141 is updated and set to 1.

In addition, when an attribute change instruction "reset_attribute Reg#n" is executed, the register file write control circuit 522 generates a write control signal for the register file 140, and the instruction execution result outputted from the pipeline buffer (WB) 137 is written into the register file 140; thereby attribute information in the attribute information holding unit 141 is updated and set to 0.

As described above, in the processor in the fifth embodiment of the present invention, it is possible to arbitrarily change, using software, attribute information in the attribute information holding unit 141 corresponding to each register.

Next, a program conversion apparatus in the fifth embodiment shall be described with reference to the drawings. The program conversion apparatus in the fifth embodiment is a compiling apparatus, which corresponds to the processor in the first embodiment, and has a feature to analyze a program structure so as to automatically insert an attribute change instruction.

On the basis of the point, the compiling apparatus according to the fifth embodiment of the present invention shall be described.

Figure 9:
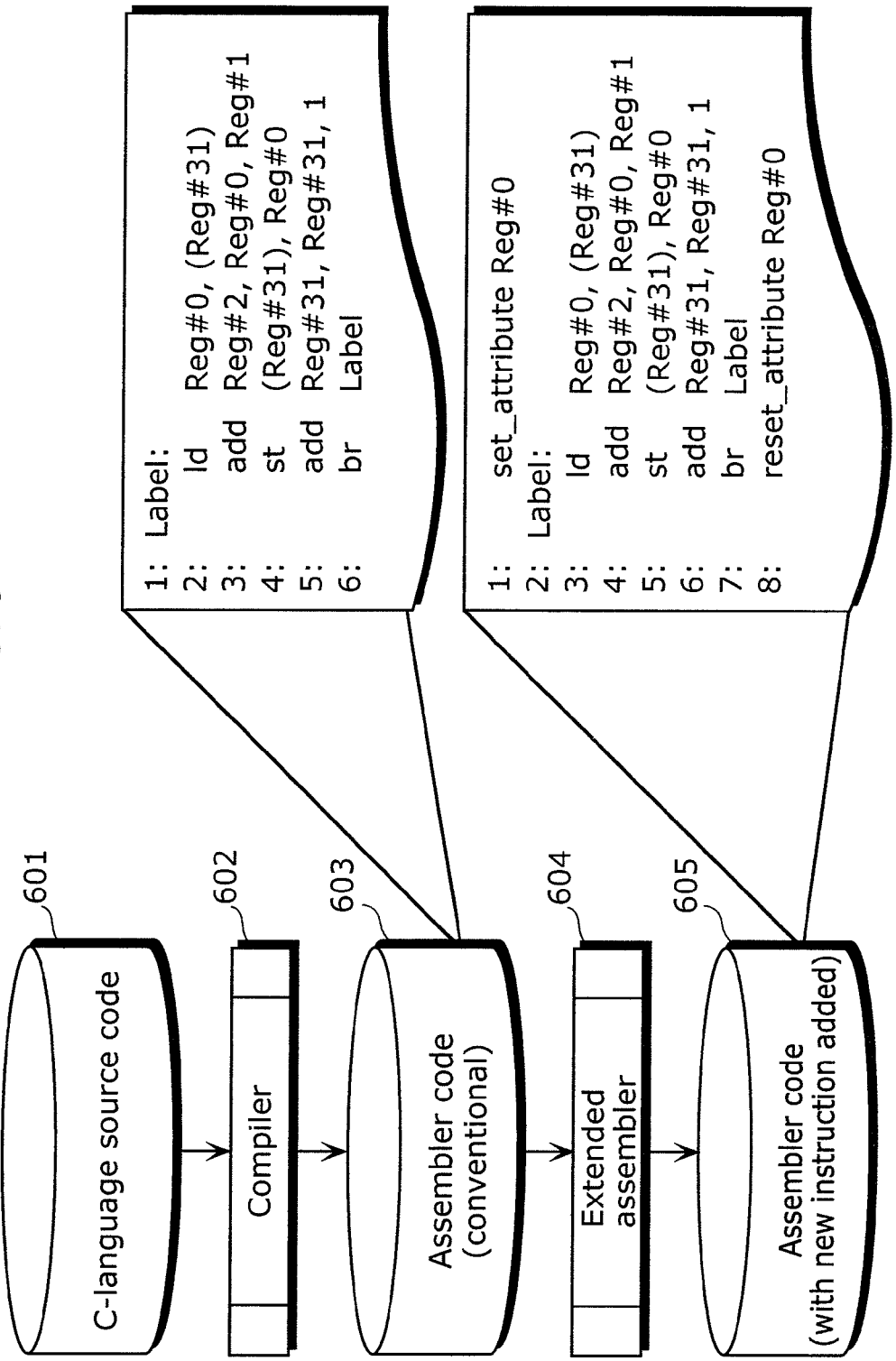
FIG. 9 is a diagram showing a configuration of a compiling apparatus.

FIG. 9 is a diagram showing a configuration of the compiling apparatus in the fifth embodiment.

As the figure shows, the compiling apparatus includes a compiler 602 and an extended assembler 604. The compiler 602 converts a C-language source code 601 that is a high-level language, into an assembler code 603 made up of the same instructions as conventional instructions.

The extended assembler 604 converts the assembler code 603 into an assembler code 605 to which an attribute change instruction is added.

For the operation of the compiling apparatus in the present invention configured as above, the operation of the compiling apparatus shall be described.

First, according to the conventional compile flow, the compiler 602 converts the C-language source code 601 that is a high-level language, into an assembler code (conventional) 603.

The details of the assembler code (conventional) 603 given as an example shall be described.

First line: Pseudo instruction to represent a Label, a branch target address when a branch instruction is executed.

Second line: Load instruction to read, using the Reg#31 data as an address, and store the read-out data in Reg#0.

Third line: Add instruction to add Reg#0 data and Reg#1 data, and store the added data in Reg#2.

Fourth line: Store instruction to write, using the Reg#31 data as an address, the Reg#0 data to the memory.

Fifth line: Add instruction to add Reg#31 and immediate data 1, and store the added data in Reg#31.

Sixth line: Branch instruction to branch (loop execution) to the instruction in the first line.

Next, the extended assembler 604 converts the assembler code (conventional) 603 into an assembler code (with a new instruction added) 605 to which an attribute change instruction is added. Here, the extended assembler 604 judges that Reg#0 is written in the second line of the assembler code (conventional) 603 and read only by an instruction in the immediately-succeeding third line, and inserts the attribute change instruction (set_attribute Reg#0) in an instruction immediately before the loop execution such that the attribute of Reg#0 is set to 1. This instruction instructs to set the attribute Atr#0 to 1. The instruction also inserts the attribute change instruction (reset_attribute Reg#0) so as to reset the attribute of Reg#0 to 0, for the time when exiting from the loop. This instruction instructs to set the attribute Atr#0 to 0.

Figure 10:
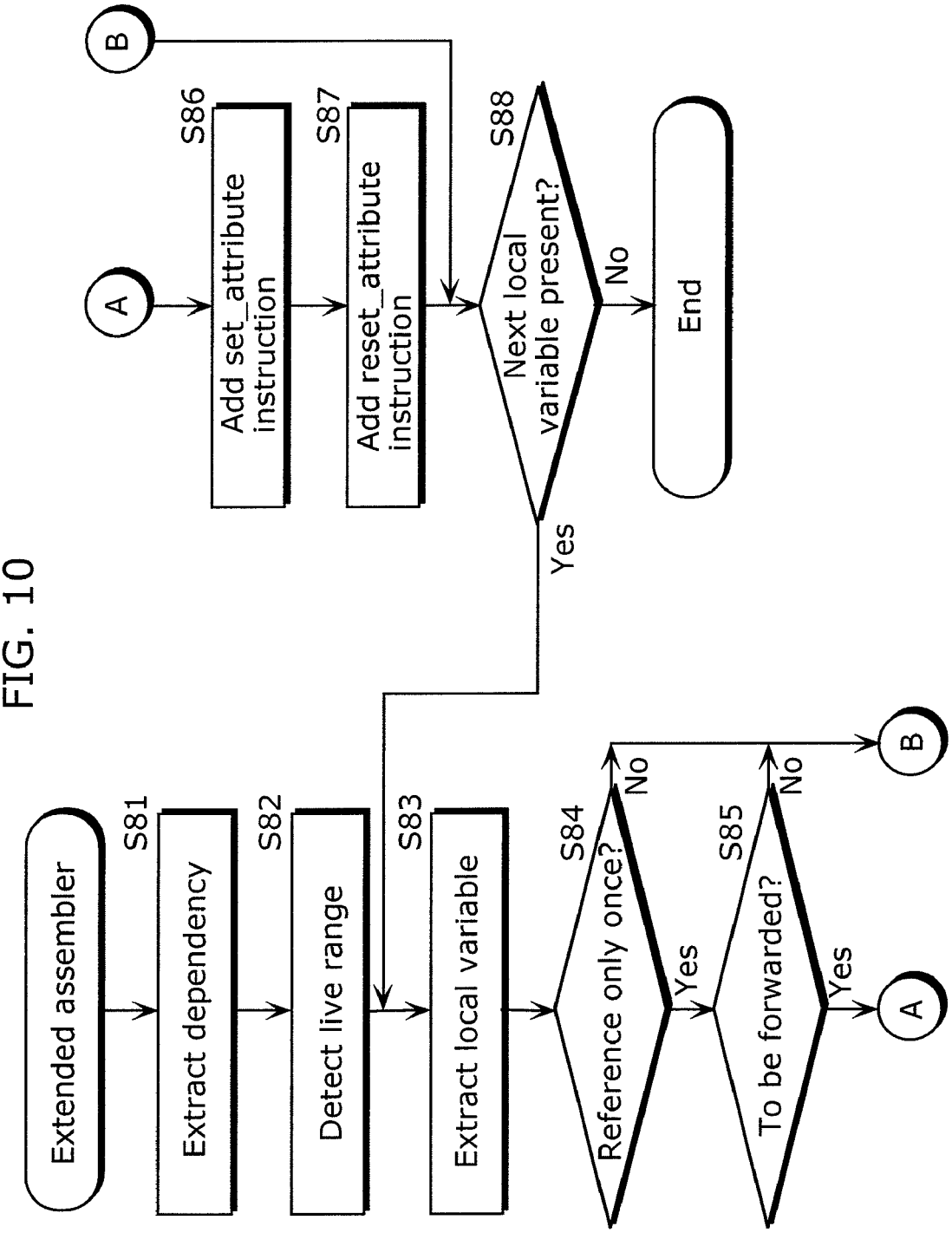
FIG. 10 is a diagram showing a processing flow of an extended assembler in a fifth embodiment.

FIG. 10 is a diagram showing a processing flow of the extended assembler 604 in the fifth embodiment. As the figure shows, the extended assembler 604 extracts, from the original assembler code 603, a variable and data dependency to be stored from the original program into the register (S81), and further detects a live range based on the dependency between instructions (S82). The live range is a range starting from an instruction to define the variable (referred to as a definition instruction) to an instruction to refer lastly to the variable (referred to as a reference instruction). Furthermore, the extended assembler 604 extracts, from among variables, a local variable that is not referred to across basic blocks (S83), judges whether or not only one reference instruction to refer to the variable is present in the live range (S84), and judges, in the live range, whether or not the definition instruction to define the variable and the reference instruction to refer to the variable are intended for forwarding (S85). At the time, whether or not the definition instruction and the reference instruction are intended for forwarding depends on the distance between the definition instruction and the reference instruction. The distance is the instruction count from the definition instruction to the reference instruction, and when, for example, the reference instruction is present immediately after the definition instruction, the distance is assumed as 1. In other words, the distance is the instruction count inserted between the definition instruction and the reference instruction+1. In this case, in the processor of the present embodiment, it is judged that the definition instruction and the reference instruction is intended for forwarding, in the case where the distance is 3 or less.

In the judgment, in the case where it is judged that there is only one reference instruction in the live range and that the reference instruction is intended for forwarding, the extended assembler 604 adds an inhibition instruction to inhibit writing to the register according to the definition instruction, so that the writing to the register according to the definition instruction is inhibited (S86 and S87). The inhibition instruction as referred to herein is: the attribute change instruction (set_attribute Reg#n) to set attribute information for inhibiting the writing to the register in which the variable is to be stored prior to the live range, and the attribute change instruction (reset_attribute Reg#n) to set attribute information for not inhibiting the writing to the register in which the variable is to be stored after the live range. The extended assembler 604 repeats the processing after Step S83 when a subsequent local variable is present (S88).

In addition, in the judgment, when it is judged that there is not only one reference instruction in the live range or where judged that the reference instruction is not intended for forwarding, the extended assembler 604 repeats the process after Step S83 when a subsequent local variable is present (S88).

According to the above, a software developer can obtain, without performing programming intended for the attribute change instruction, an effect of reducing power consumption by using the processor in the fifth embodiment.

Note that it is sufficient that the (set_attribute Reg#n) instruction comes immediately before the definition instruction, and the (reset_attribute Reg#n) instruction comes immediately after the reference instruction, but it is preferable to insert the latter instruction, as shown in FIG. 9, into a position immediately after the exit from the loop.

Sixth Embodiment

Hereinafter, a sixth embodiment of the present invention shall be described with reference to the drawings. In the present embodiment, a configuration shall be described in which attribute information is not held corresponding to each register, but is held, corresponding to the respective data to be forwarded, in plural-staged pipeline buffers and assigned to the pipeline buffers.

Figure 11:
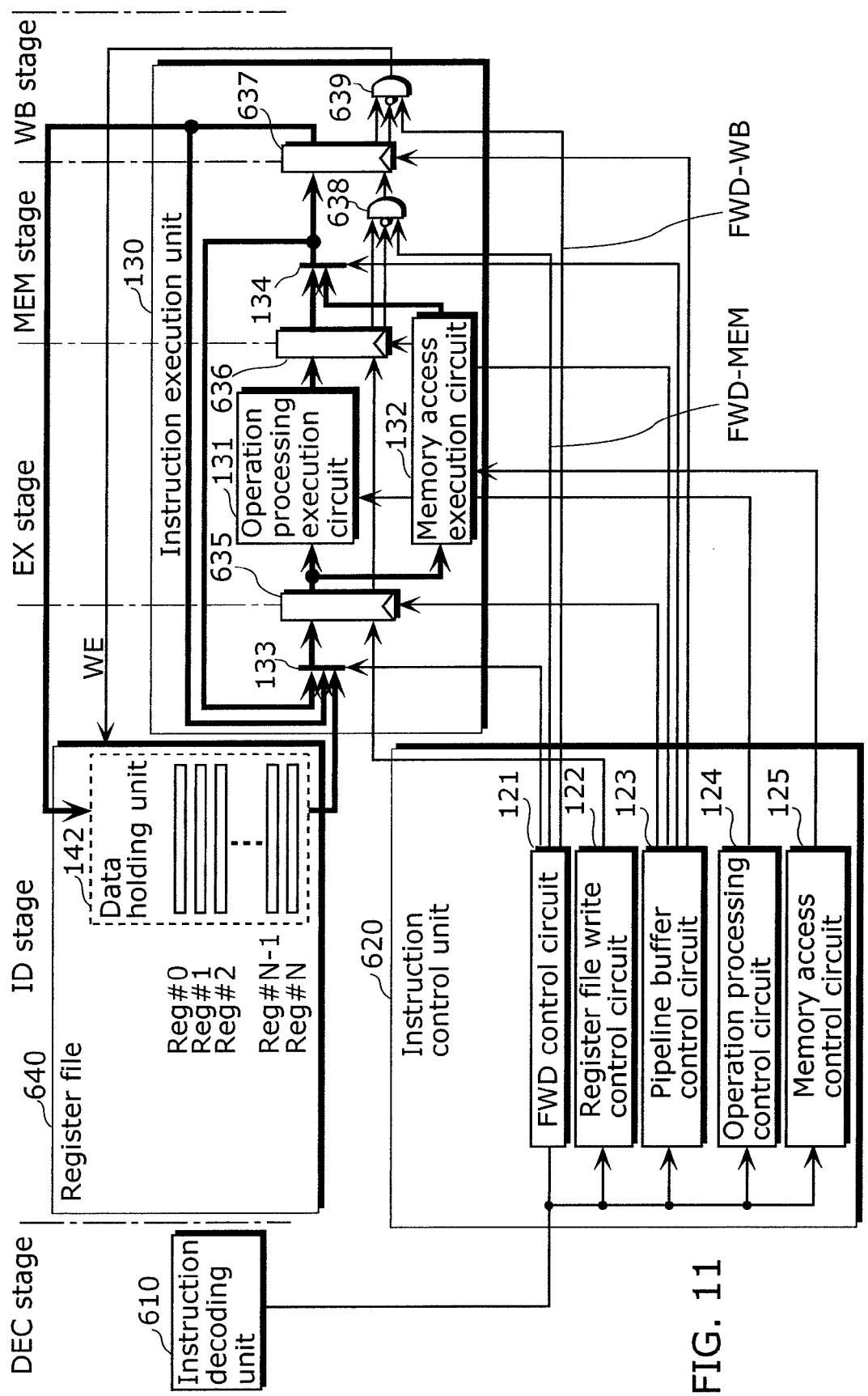
FIG. 11 is a diagram showing a configuration of a processor in a sixth embodiment.

FIG. 11 is a diagram showing a configuration of the processor in the sixth embodiment. The difference between the processor shown in FIG. 11 and the processor in the first embodiment is that the former includes: a register file 640 in place of the register file 140; an instruction control unit 620 in place of the instruction control unit 120; an instruction decoding unit 610 in place of the instruction decoding unit 110; pipeline buffers 635 to 637 in place of the pipeline buffers 135 to 137; and inhibition gates 638 and 639 in place of the inhibition gage 138 and 139.

The register file 640 includes a data holding unit 142, but does not include an attribute information holding unit 141 corresponding to each register. In the present embodiment, a part of the pipeline buffers from 635 to 637 functions as an attribute information holding unit, in order that attribute information *S is held corresponding to the data to be forwarded.

The instruction decoding unit 610 is different in that it decodes an instruction including a register write inhibition indication, in addition to the function of the instruction decoding unit 110. The processor supports the two following kinds of instructions as instructions to write data to the register: an ordinary instruction not including a resister write inhibition indication, and an inhibition instruction including a register write inhibition indication. For example, it is also possible to execute, besides an ordinary load indication (IdReg#0, (Reg#31)), a load instruction (Id*Reg#0, (Reg#31)) with an inhibition indication. For the mnemonic description of the inhibition instruction, * is added to the ordinary instruction.

The instruction control unit 620 is different from the instruction control unit 120 in that the former does not include a register write inhibition circuit 126.

Figure 12:
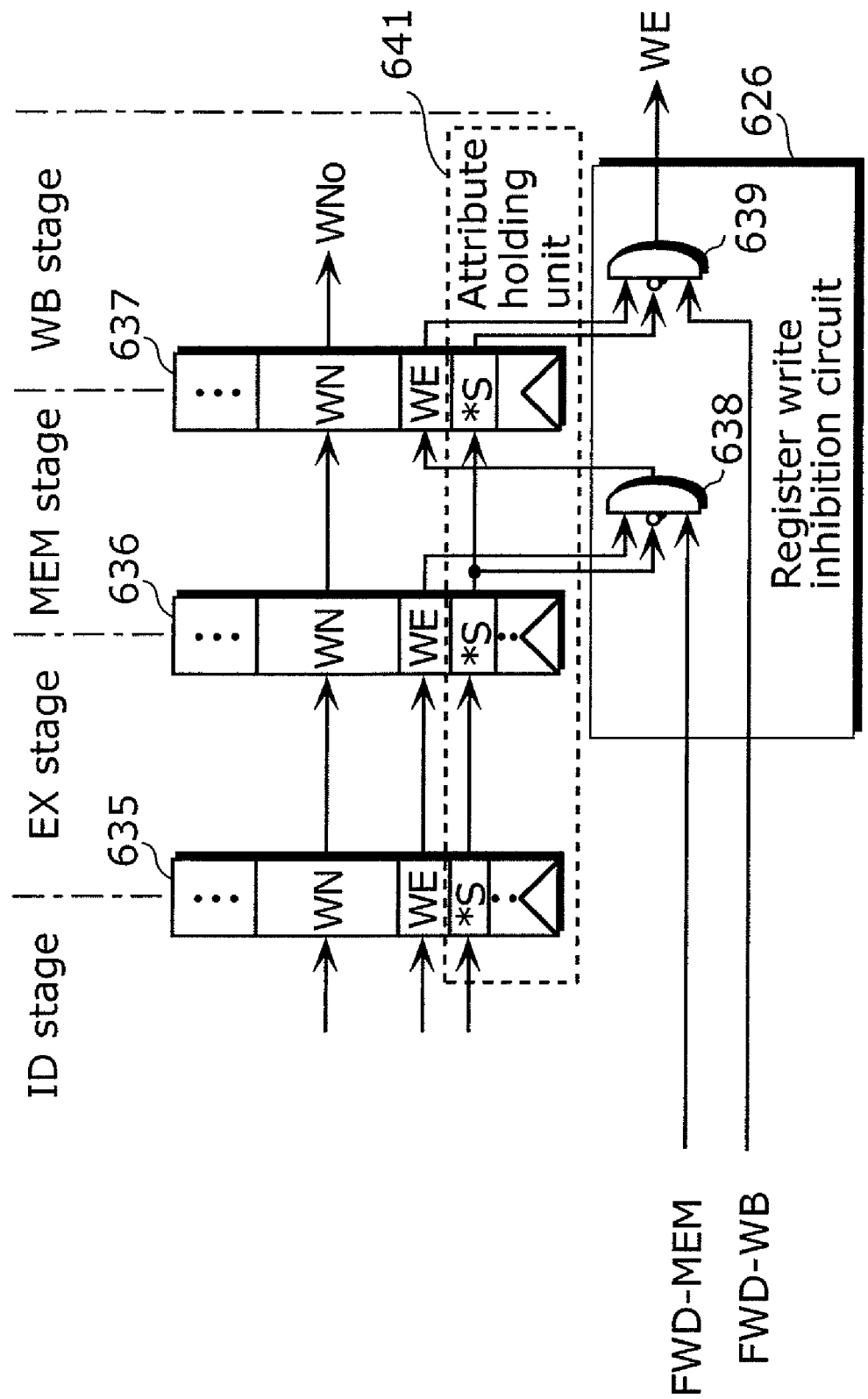
FIG. 12 is a diagram showing a configuration of an attribute holding unit and a register write inhibition circuit.

FIG. 12 a diagram showing an exemplary configuration of a part of the pipeline buffers 635 to 637 and the inhibition gates 638 and 639.

In addition to the function to sequentially pass data between pipeline stages, as is the case with the pipeline buffers 135 to 137, the pipeline buffers 635 to 637 pass, along with data to be forwarded, attribute information *S to one of the pipeline buffers in a subsequent stage corresponding to the attribute information. The attribute information *S is written into the pipeline buffer 635 by the instruction decoding unit 610, along with a WN signal and a WE signal, when the instruction decoding unit 610 decodes the above inhibition instruction, so as to be passed to the pipeline buffers 636 and 637 in subsequent stages. As described above, the part of the pipeline buffers 635 to 637, which make up the attribute holding unit 641 that holds attribute information *S in association with the data to be forwarded, functions as an attribute information holding unit.

The inhibition gates 638 and 639 function as the register write inhibition circuit 126, in addition to the functions of the inhibition gates 138 and 139.

Into the inhibition gate 638, a FWD-MEM signal indicating the forwarding operation from the MEM stage to the ID stage, attribute information *S outputted from the pipeline buffer (MEM) 636, and a WE signal outputted from the pipeline buffer (MEM) 636 are inputted. For these inputted signals, in the case where the FWD-MEM signal is asserted and where the attribute information *S (register write inhibition) indicates 1, the inhibition gate 638 inhibits the writing of the forwarded data into the register by masking the WE signal.

Into the inhibition gate 639, a FWD-WB signal indicating the forwarding operation from the WB stage to the ID stage, the attribute information *S outputted from the pipeline buffer (WB) 637, and a WE signal outputted from the pipeline buffer (WB) 637 are inputted. For these inputted signals, in the case where the FWD-WB signal is asserted and where the attribute information *S indicates 1 (register write inhibition), the inhibition gate 639 inhibits the writing of the forwarded data into the register by masking the WE signal. Thus, the inhibition gates 638 and 639 make up the register write inhibition circuit and function as a control unit that controls the writing to the register.

For the operation of the processor in the present embodiment configured as above, the description shall be omitted for the same points as in the processor in the first embodiment, and the point of difference shall be described.

(WB Stage)

In the WB stage, in accordance with the instruction decoding information, the register file write control circuit 122 generates a write control signal for the register file 640, and writes the instruction execution result outputted from the pipeline buffer (WB) 637 into the register file 640; thereby data is updated in the data holding unit 142.

However, in the case where it is detected that the executed instruction is an instruction that is defined as the register write inhibition instruction and that the instruction execution result has been read by the forwarding operation, according to the succeeding instruction, in the step from the FWD control circuit 121 to the MEM stage or the WB stage, the register file write control circuit 122 does not generate a write control signal for the register file 640, so that the instruction execution result outputted from the pipeline buffer (WB) 637 is not written into the register file 640, and data in the data holding unit 142 is not updated.

As described above, in the processor according to the sixth embodiment of the present invention, it is possible to reduce the circuit scale by not having an attribute information holding unit, and to obtain the same effect as with the processor of the first embodiment.

Next, a program conversion apparatus in the present embodiment shall be described with reference to the drawings.

The program conversion apparatus in the sixth embodiment is what is known as a compiling apparatus, and corresponds to the processor in the present embodiment, and has a feature to analyze a program structure so as to convert an ordinary instruction into a register write inhibition instruction.

On the basis of the point, the compiling apparatus according to the sixth embodiment of the present invention shall be described.

Figure 13:
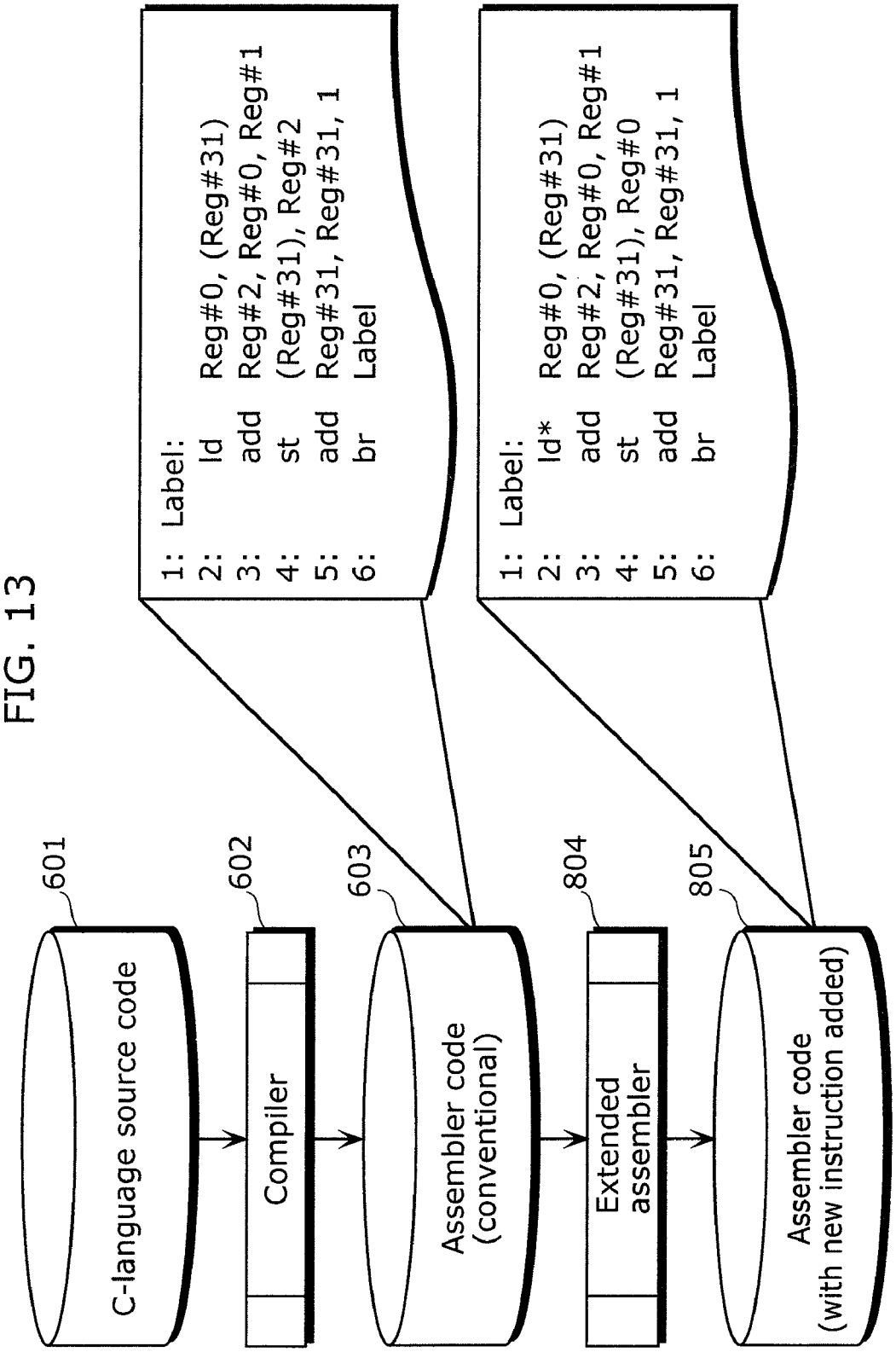
FIG. 13 is a diagram showing a configuration of a compiling apparatus.

FIG. 13 is a diagram showing the configuration of the compiling apparatus in the sixth embodiment.

As the figure shows, in the present compiling apparatus, the C-language source code 601 that is a high-level language is converted by the compiler 602 into an assembler code (conventional) 603, whereas the assembler code (conventional) 603 is further converted, through an extended assembler 804, into an assembler code (with a new instruction added) 805 to which an attribute change instruction is added.

The operation of the compiling apparatus shall be described.

First, according to the conventional compile flow, the C-language source code 601 that is a high-level language is converted by the compiler 602 into the assembler code (conventional) 603.

The details of the assembler code (conventional) 603 given as an example shall be described.

First line: Label to indicate a branch address when a branch instruction is executed.

Second line: Load instruction to read, using the Reg#31 data as an address, and store the read-out data in Reg#0.

Third line: Add instruction to add Reg#0 data and Reg#1 data, and store the added data in Reg#2.

Fourth line: Store instruction to write, using the Reg#31 data as an address, the Reg#2 data to the memory.

Fifth line: Add instruction to add Reg#31 and immediate data 1, and store the added data in Reg#31.

Sixth line: Branch instruction to branch (loop execution) to the instruction in the first line.

Next, the assembler code (conventional) 603 is converted, through an extended assembler 804, into the assembler code (with a new instruction added) 805 that is a register write inhibition instruction converted from a conventional instruction. Here, in the extended assembler 804, it is judged that Reg#0 is written in the second line of the assembler code (conventional) 603 and read only according to an instruction in the immediately-succeeding third line, and the read-to-memory instruction (ld) in the second line is converted into a read-to-memory instruction in the register write inhibition instruction (ld*).

Figure 14:
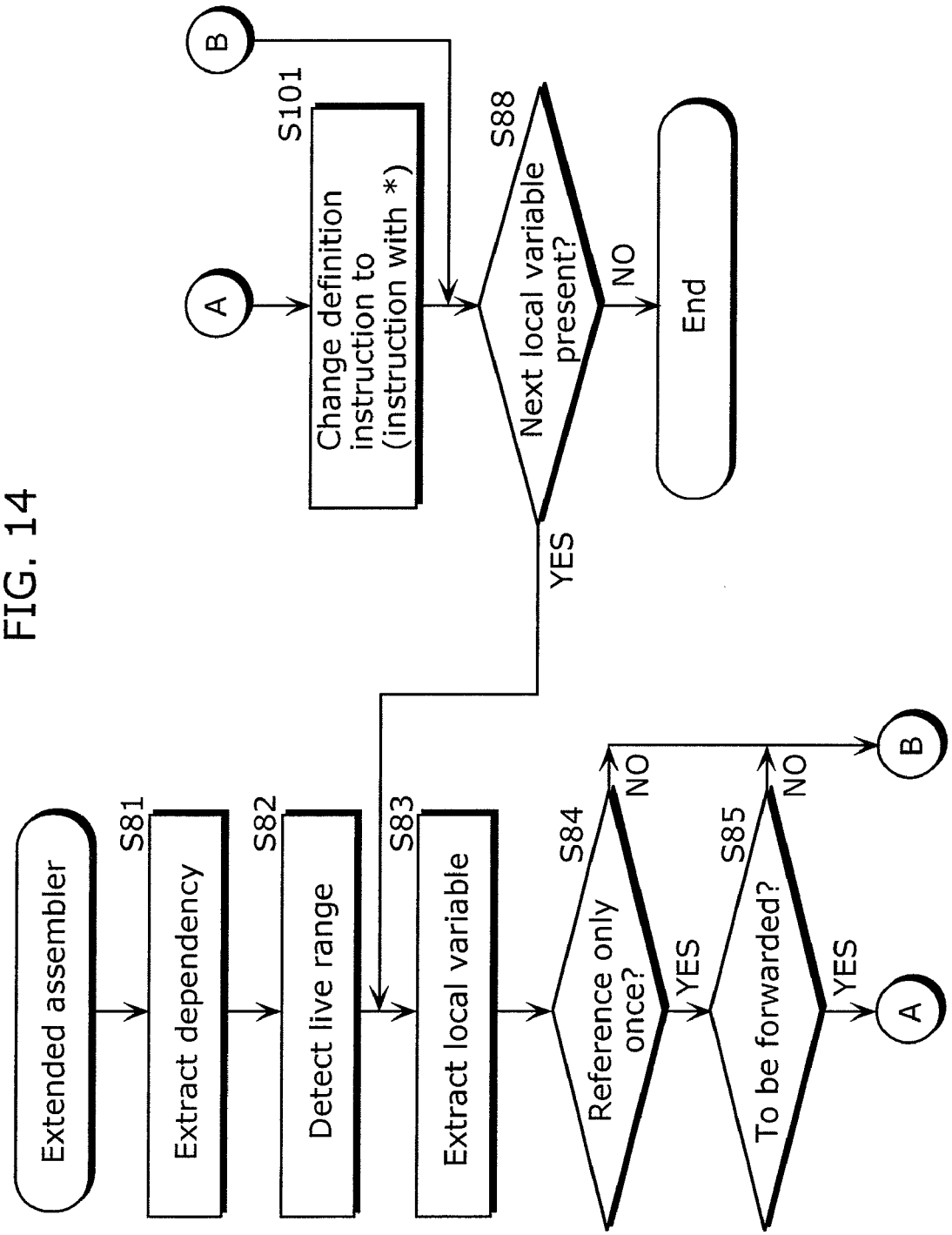
FIG. 14 is a diagram showing a processing flow of an extended assembler.

FIG. 14 is a diagram showing a processing flow of the extended assembler in FIG. 13. The processing flow in the figure is different from the processing flow shown in FIG. 9 in that the former includes S101 instead of Steps S86 and S87. The description of the same points shall be omitted, and the point of difference shall be described.

In the judgment in Steps S84 and S85, in the case where it is judged that only one reference instruction is present in the live range and that the reference instruction is intended for forwarding, the extended assembler 804 converts, in order to inhibit the writing to the register according to the definition instruction, the definition instruction from an ordinary instruction into an inhibition instruction (the instruction with * added as described above) that involves the inhibition of the writing to the register (S101).

According to the above, a software developer can obtain an effect of reducing power consumption, using the processor in the sixth embodiment, without performing programming intended for the attribute change instruction.

Note that the present invention may be implemented not only as a processor but also as a method for controlling the processor (hereinafter, referred to as a control method) and so on. In addition, the present invention may also be implemented as: a large scale integration (LSI) in which functions provided by the processor (hereinafter, referred to as processor functions) are incorporated; an IP core (hereinafter, referred to as a processor core) in which such processor functions are formed on a programmable logic device such as a Field Programmable Gate Array (FPGA) and a Complex Programmable Logic Device (CPLD); and a recording medium on which the processor core is recorded.

In addition, it goes without saying that any one of the above embodiments may be combined. For example, a combination of the fifth and the six embodiments can produce an effect without incompatibility.

INDUSTRIAL APPLICABILITY

The present invention can be utilized in areas requiring reduced power consumption, as a processor included in a cellular phone and so on.

The invention claimed is:

1. A program conversion apparatus, stored in a computer, to convert an original program into a converted program that is executable by a processor, the computer including a memory, the program conversion apparatus comprising:

an extractor, caused by the computer, to extract, from the original program, a variable to be stored in a register;

a detector, caused by the computer, to detect a live range for the extracted variable;

a first determiner, caused by the computer, to determine whether only one reference instruction is present in the live range, the reference instruction being an instruction to refer to the variable;

a second determiner, caused by the computer, to determine whether a definition instruction and the reference instruction are intended for forwarding, the definition instruction being an instruction to define the variable; and a generator, caused by the computer, to generate the converted program including an inhibition instruction to inhibit writing to the register according to the definition instruction, when it is determined that only one reference instruction is present in the live range and that the reference instruction is intended for forwarding, wherein, the inhibition instruction includes:

a first attribute change instruction to set, prior to the live range, first attribute information to said memory, the first attribute information being for inhibiting the writing to the register in which the variable is to be stored; and a second attribute change instruction to set, subsequent to the live range, second attribute information to said memory, the second attribute information being for not inhibiting the writing to the register in which the variable is to be stored, and said generator is configured to add the first attribute change instruction and the second attribute change instruction to the original program to generate the converted program.

2. A program conversion apparatus, stored in a computer, to convert an original program into a converted program that is executable by a processor, the computer including a memory, the program conversion apparatus comprising:

an extractor, caused by the computer, to extract, from the original program, a variable to be stored in a register;

a detector, caused by the computer, to detect a live range for the extracted variable;

a first determiner, caused by the computer, to determine whether only one reference instruction is present in the live range, the reference instruction being an instruction to refer to the variable;

a second determiner, caused by the computer, to determine whether a definition instruction and the reference instruction are intended for forwarding, the definition instruction being an instruction to define the variable; and a generator, caused by the computer, to generate the converted program including an inhibition instruction to inhibit writing to the register according to the definition instruction, when it is determined that only one reference instruction is present in the live range and that the reference instruction is intended for forwarding, wherein the inhibition instruction is a definition instruction with inhibition, which involves a same operation as the definition instruction and a register write inhibition indication, and said generator is configured to generate the converted program by changing the definition instruction in the original program into the definition instruction with inhibition.

3. A non-transitory computer-readable medium including an executable program for converting an original program into a converted program, comprising:

an extracting code segment that, when executed, extracts, from the original program, a variable to be stored in a register;

a detecting code segment that, when executed, detects a live range for the extracted variable;

a first determining code segment that, when executed, determines whether only one reference instruction is present in the live range, the reference instruction being an instruction to refer to the variable;

a second determining code segment that, when executed, determines whether a definition instruction and the reference instruction are intended for forwarding, the definition instruction being an instruction to define the variable; and a generating code segment that, when executed, generates the converted program including an inhibition instruction to inhibit writing to the register according to the definition instruction, when it is determined that only one reference instruction is present in the live range and that the reference instruction is intended for forwarding, wherein, the inhibition instruction includes:

a first attribute change instruction to set, prior to the live range, first attribute information to a memory, the first attribute information being for inhibiting the writing to the register in which the variable is to be stored; and a second attribute change instruction to set, subsequent to the live range, second attribute information to the memory, the second attribute information being for not inhibiting the writing to the register in which the variable is to be stored, and the generating code segment adds the first attribute change instruction and the second attribute change instruction to the original program to generate the converted program.

4. A non-transitory computer-readable medium including an executable program for converting an original program into a converted program, comprising:

an extracting code segment that, when executed, extracts, from the original program, a variable to be stored in a register;

a detecting code segment that, when executed, detects a live range for the extracted variable;

a first determining code segment that, when executed, determines whether only one reference instruction is present in the live range, the reference instruction being an instruction to refer to the variable;

a second determining code segment that, when executed, determines whether a definition instruction and the reference instruction are intended for forwarding, the definition instruction being an instruction to define the variable; and a generating code segment that, when executed, generates the converted program including an inhibition instruction to inhibit writing to the register according to the definition instruction, when it is determined that only one reference instruction is present in the live range and that the reference instruction is intended for forwarding, wherein the inhibition instruction is a definition instruction with inhibition, which involves a same operation as the definition instruction and a register write inhibition indication, and the generating code segment generates the converted program by changing the definition instruction in the original program into the definition instruction with inhibition.

* * * * *